United States Patent [19]
Chocol et al.

[11] 3,959,580
[45] May 25, 1976

[54] DIRECTLY VIEWABLE STEREOSCOPIC PROJECTION SYSTEM

[75] Inventors: Clifford J. Chocol, Engelwood; Carl E. Polhemus, Lakewood, both of Colo.

[73] Assignee: Martin Marietta Corporation, New York, N.Y.

[22] Filed: Nov. 21, 1974

[21] Appl. No.: 525,905

Related U.S. Application Data

[63] Continuation of Ser. No. 389,764, Aug. 20, 1973, abandoned.

[52] U.S. Cl.................. 178/6.5; 350/131; 350/211; 352/57
[51] Int. Cl.[2].............. G02B 27/22; G02B 3/08; G03B 35/00; H04N 9/54
[58] Field of Search............. 350/131, 211; 352/57; 178/6.5; 358/3, 88

[56] References Cited
UNITED STATES PATENTS

| | | |
|---|---|---|
| 2,891,444 | 6/1959 | Ewald .................................. 350/131 |
| 2,955,156 | 10/1960 | Heilig.................................. 178/6.5 |
| 3,293,358 | 12/1966 | Ratliff................................. 178/6.5 |
| 3,525,807 | 8/1970 | Herriott............................... 350/211 |
| 3,547,520 | 12/1970 | Lee...................................... 350/131 |
| 3,670,097 | 6/1972 | Jones................................... 178/6.5 |
| 3,705,261 | 12/1972 | Langley ............................... 178/6.5 |

OTHER PUBLICATIONS

Weldon, Roger et al., "Apparent Motion . . . Stereo Base," JOSA, Vol. 55, No. 7, pp. 896–897, July 1965.

*Primary Examiner*—Howard W. Britton
*Attorney, Agent, or Firm*—Sughrue, Rothwell, Mion, Zinn & Macpeak

[57] ABSTRACT

Stereoscopic inputs given by a display, where the stereo images are centered on respective intersecting optical axes, which images both stereo inputs on a field lens at the intersecting which forms, in turn, exit pupils at a predetermined focal distance from the field lens on the respective optical axes. The input lenses are spaced such that the distance between the formed pupils is equal to the interpupillary distance of the viewer. The viewer merely positions himself such that his right eye is coincident with the one exit pupil and the left eye becomes coincident with the other exit pupil. Selection of the proper optics for any given stereo application first requires consideration of the parameters involved and their influence on the application at hand. Some of the display parameters are necessarily linked to sensor parameters and vice versa. Also, certain visual system parameters are dictated.

3 Claims, 2 Drawing Figures

DIRECTLY VIEWABLE STEREOSCOPIC PROJECTION SYSTEM

This is a continuation of application Ser. No. 389,764, filed Aug. 20, 1973, now abandoned.

BACKGROUND OF THE INVENTION

1. Field of the Invention

This invention relates to stereoscopic viewing systems, and more particularly to a projection system in which the need of a viewing hood, polaroid glasses, prisms or other viewing aids is completely eliminated.

2. Description of the Prior Art

Various stereo projection methods or systems have been employed in the past to provide optical displays of or permit viewing of an image in three dimensions. One type of system, known as "diffuse stereo screen projection," projects the image onto a diffuse screen and provides the advantage that viewing is not limited to a precise number of viewers. A plurality of viewers or spectators may fit into the room housing the diffuse stereo projection screen, however, the disadvantages of this method are numerous. The system is characterized, in a typical film projection system, by the requirement of projecting onto the screen images through a lens system from left and right films through the use of left and right polairzers respectively and requiring in turn viewing of the projected image through polarized glasses whose lenses are polarized corresponding to those of the right and left polarizer of the optical projection system. Further, a lenticular screen must be used to preserve the polarization of the projected images. This method has poor power efficiency due to the wide viewing field of the screen, and consequently intense transparency illumination is necessary for proper projection. Another system utilizes a split field created by a set of prisms or mirrors. The viewer must view the scene by looking into a hood or wear a special set of prism glasses, both restricting his view of other data in the vicinity of the screen.

Attempts have been made to achieve direct viewing of a stereo image by a number of people, in several ways. One arrangement employs stereo viewing consoles at specific stations in which the screen displaying the stereo image at each location receives that image by way of a beam splitter such that the projected image is split into multiple beams after initial projection from the stereo projector. While the beam splitters may be installed or removed to variably accommodate the number of viewers, each additional viewer requires a beam splitter and the intensity of the lamp to maintain the brilliance of the multiple images being viewed, must be increased accordingly. In such systems, there is a limit to the intensity of the source without damaging the transparencies or photographic prints.

SUMMARY OF THE INVENTION

The present invention is directed to a direct viewable stereoscopic display system including the sensor, in the form of first and second optical trains for the stereo inputs defining intersecting optical axes, with the stereo input for each train being centered on its optical axis. Each train further includes lens means for focusing respectively a stereo image at the intersection of the axes. A field lens is provided at the intersection for forming respectively, exit pupils corresponding to the inputs at a focal distance from the field lens such that the viewer situated at that distance from the field lens has his eyes coincident respectively with said formed image pupils. Preferably, the field lens comprises a Fresnel lens and may include means for spreading the pupils along an axis at right angles to the plane defined by the eyes of the viewer and the center of the display screen which coincides with the intersection of the optical axis. Further, means may be provided for converting the display to monoscopic operation by blocking one of the optical axes and rotating the display screen or its pupil spreading component to 90° about its optical axis resulting in spreading the single exit pupil in a horizontal direction to permit viewing of the display monoscopically. Alternatively, larger imaging lenses may be employed which are masked to provide desired pupil shape to obtain pupil spreading to the degree and extent necessary.

DESCRIPTION OF PREFERRED EMBODIMENTS

Figure 1:
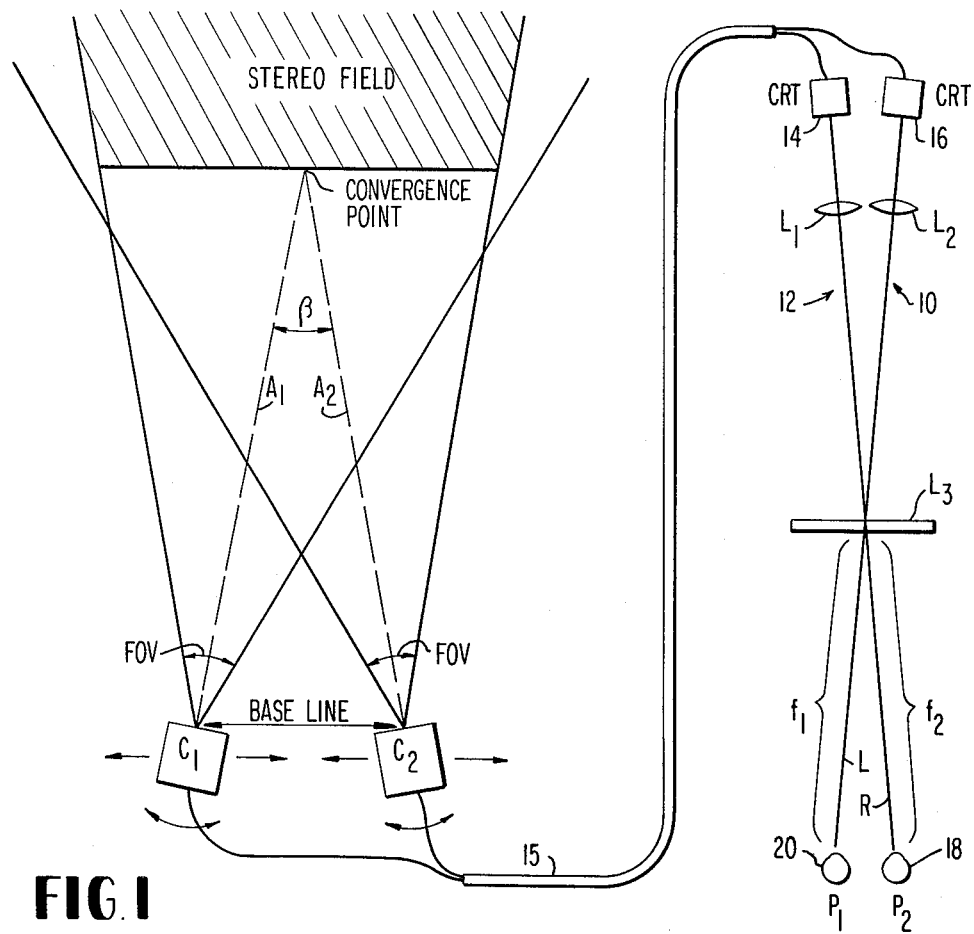
FIG. 1 is a simplified, schematic plan view of the stereoscopic optical projection system of the present invention in one form.

The system of stereo projection proposed by the present invention allows direct viewing without the aid of a viewing hood, polaroid glasses, prisms, beam splitters, mirrors, or other viewing aids, and provides a system capable of projecting full color images from photographic prints, transparencies, television monitors or any other image forming device. The stereo projection is achieved by generating two exit pupils such that the right eye image falls on the right eye and the left eye image falls on the left eye of the viewer $P_1$ $P_2$, as illustrated schematically in FIG. 1. The objects in the stereoscopic field of view will appear at or behind the display screen $L_3$ provided the two television cameras $C_1$ and $C_2$ comprising the stereo sensor converge at the near end of the desired depth of field. This is important since a scene appearing closer to the viewer than its restricting border is unnatural and consequently disturbing. The objects appear to be floating in space in front of the display console. Stereoscopic perception of such images is not impossible but frequently causes discomfort and image registration difficulties. If the camera fields of view (FOV) are at least as great as the convergence angle $\beta$ of the camera pair, objects ranging in distance from the camera convergence point to infinity will be properly displayed. As the field of view (FOV) of the cameras is increased, the effective field of view of the system increases, as illustrated in FIG. 1. The broken lines $A_1$, $A_2$ represent the optical axes of the two cameras intersecting at the convergence point, the solid lines represent the lenses. If distances and dimensions are to appear realistic, the convergence point should be the same distance from the cameras as the screen is from the eye and the camera field of view should be equivalent to the visual field of view of the display. Satisfaction of these criteria will result in a display as realistic as the system resolution allows. Camera $C_1$ may be moved along the baseline relative to Camera $C_2$, and each camera may be rotated about an axis at right angles to the plane of the convergence point and the baseline.

A reduction in the field of view, as with zoom lenses or an increase in the stereo baseline or lateral distance between stereo inputs will provide an enhanced view of a smaller volume, but some degree of visual distortion will result due to a conflict between stereoscopic image disparity, eye convergence cues, and apparent field of view. Depth dimensions will be exaggerated and perspective will be distorted. Enhanced depth perception can be of great benefit in tasks where the depth range is small and realism and actual dimensions are not the prime consideration.

If the field of view is reduced without a corresponding reduction in the convergence angle, the stereoscopic field of view in FIG. 1 may become finite. To avoid this potentially disturbing situation, the convergence angle $\beta$ can be slaved to the camera field of view (FOV) so that the two are always related by the relationship:

$$\beta = \left(2 \tan \frac{FOV}{2}\right)\left(\frac{d}{D}\right)$$

where
$\beta$ = convergence angle
$FOV$ = camera field of view
$d$ = maximum desired lateral image displacement between right and left images (normally limited by viewer's interpupillary dimension)
$D$ = display screen horizontal dimension Of necessity, the two parameters both must be varied, that is, the field of view of each of the stereo sensors such as television cameras, for instance, must be changed at the same time that their convergence angle $\beta$ in terms of their optical axes is varied to fulfill the requirements of the formula above.

As in monoscopic imaging systems, size scaling can also be achieved with a stereoscopic visual system. In monoscopic systems accurate scaling is achieved by changing the object distance while holding the camera field of view and display size constant. A stereoscopic system also requires a fixed field of view and display size for accurate scaling, but now the stereo baseline, in addition to the object distance must be changed by a factor equal to the desired scale factor. For example, if a small 1/10th scale image of a large object is desired, the stereo baseline and the object distance must be increased by a factor of 10 while the camera field of view, convergence angle, and display size are held constant. A combination of scaling, depth exaggeration (or suppression) and image distortion will occur if these criteria are not followed.

The system as illustrated schematically in FIG. 1 is comprised of a left and right optical train indicated generally at 10 and 12 respectively, which is established for each of two optical inputs of the stereo pair and which include at 14 and 16 respectively, TV monitors or the like, such as cathode ray tubes. Alternatively, the inputs may be transparencies, opaque prints or the like. Assuming that stereo inputs 14 and 16 comprise TV monitors, they are electrically coupled to cameras $C_1$ and $C_2$ respectively and receive electrical signals therefrom via communication cables 15. For instance, the optical trains 10 and 12 have their axes identified respectively as L for the left eye and R for the right eye of the viewer. The stereo input 14 corresponding to the right eye is centered on the optical axis R. The optical train 16 includes a lens $L_2$ which images the stereo input 16 on or near lens $L_3$ while lens $L_1$ for the right optical axis R images stereo input 14 also at or near lens $L_3$. At the position of lens $L_3$, the two optical axes cross or intersect, thus superimposing the two stereo images at that point. The lens $L_3$, which may be a Fresnel lens, forms an exit pupil $P_2$ at a focal distance $f_2$ from lens $L_3$ on optical axis R, for instance, while the same Fresnel lens $L_3$ forms an exit pupil $P_1$ at the same distance $f_1$ from lens $L_3$ on optical axis L. The imaging lenses are imaged one to one in terms of magnification to the exit pupils, then the distance from the Fresnel lens to the imaging lens is two focal lengths of the Fresnel lens and also the distance from the Fresnel lens to the exit pupils is two focal lengths of that lens. Further, lens $L_1$ and lens $L_2$ are spaced such that the distance between $P_1$ and $P_2$ is equal to the interpupillary distance of the viewer, and in this respect, the viewer (simulated by eyes) situates himself so that his right eye 18 is coincident with exit pupil $P_2$ and his left eye 20 is coincident with exit pupil $P_1$. The display will then appear three dimensional in every respect to the viewer.

While FIG. 1 shows two identical optical trans 10 and 12, and two equal size stereo inputs as at 14 and 16, this is not a requirement for the invention. Lenses $L_1$ and $L_2$ may be zoom lenses with continuously variable focal length, and the scale of one or both stereo inputs 14 and 16 may be changed without alteration of the image size. As noted previously, the field lens $L_3$ may constitute an inexpensive Fresnel lens.

The system based on the schematic representation of FIG. 1 may be designed for the desired viewer to monitor distance, and the viewer need not place his eyes against any viewing apparatus. No polarized glasses or other viewing aids are required, the system allows intermittent viewing of the display, instrument panels, and other surrounding objects. Advantages include the capability of using prints, transparencies or television picture tubes or any other form of imagery as the stereo inputs and high power efficiency. The limitation of the system is the restriction of head movement from optical center which is typically within a space in terms of 6 inches times 3 inches by 1.3 inches. The system of the present invention has application to manipular arm viewing and other manned and unmanned indirect viewing requiring depth perception. The system has application to aerial photography, contour mapping and viewing and numerous medical applications including vectorcardiography, tomography and crystalography. The system of the present invention further permits stereo viewing of processes which might impair vision by direct viewing and has application to commercial motion picture and home television systems.

As mentioned previously, there are mechanical limitations in terms of restriction of head movement due to the formation of and nature of the produced pupils $P_1$ and $P_2$ of the system of FIG. 1, for instance. This is because the allowable horizontal head movement for viewing stereo scopic displays without glasses is physiologically restricted to 6.35 cm or 2.6 inches which is the average spacing between the pupils of a typical viewer, in the absence of an eye tracking device. Since the stereo information is obtained in the horizontal direction only, the allowable vertical head motion is not restricted by physiological parameters. Vertical motion is restricted only by the display subsystem parameters.

Figure 2:
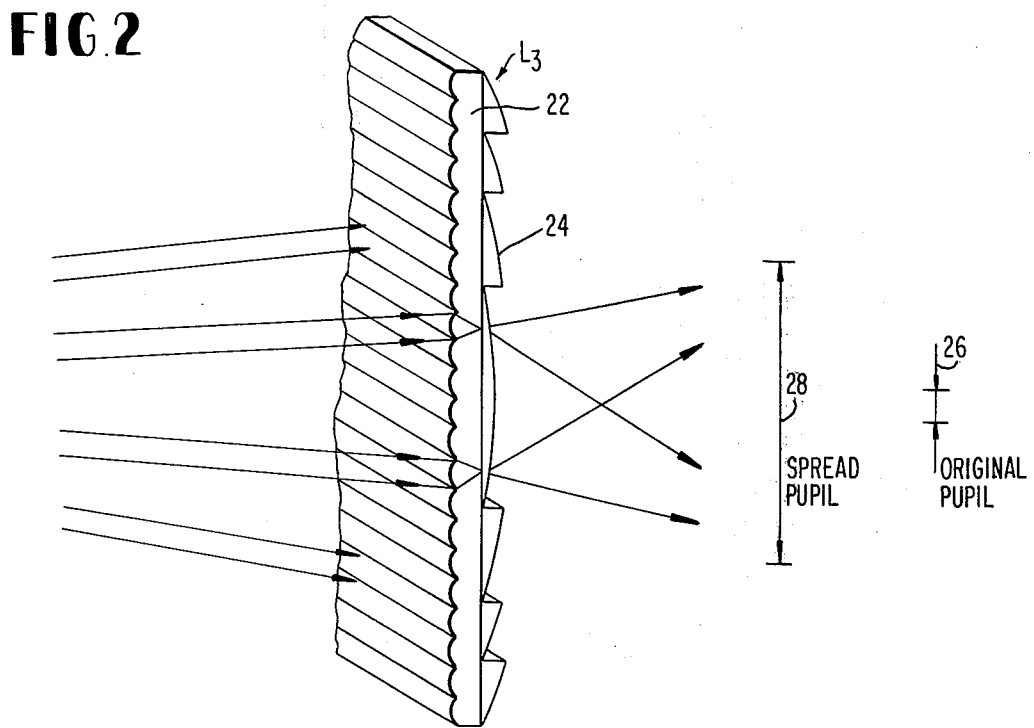
FIG. 2 is an enlarged perspective, schematic view of one portion of the optical projection system of FIG. 1, further incorporating pupil spreading means in one form to increase viewability or to permit the stereoscopic display to be converted to monoscopic form.

By reference to FIG. 2, the technique of the present invention further includes the employment of a horizontal pupil spreading, lenticular lens 22 to spread the light vertically from each point on the screen to an angle prescribed by screen design. Vertical head motion on the order of 30.5 cm (12 inches) is easily obtained using this technique in conjunction with the Fresnel stereoscopic display. Thus, the horizontal lenticular lens 22 is presented with Fresnel lens 24 on the side facing the viewer, as illustrated. In this case, instead of the original pupil having a spread dimentions 26 shown, the pupil spread is enlarged as illustrated at 28 by the effect of the light passing through the composite screen 22 and 24. The illumination efficiency of brightness of the modified display is reduced but is still greater than other types of displays.

The pupil spreading technique as illustrated in FIG. 2 has additional versatility as a method of converting stereoscopic display to one which is monoscopic in nature. If both monitors in display are operating, the right and left pupils $P_1$ and $P_2$ are spread vertically for stereoscopic vision as illustrated in FIG. 2. However, if one of the monitors malfunctions, the display can be seen only with one eye. In this situation, the display can be converted to monoscopic operation by simply rotating the entire display screen or the lenticular screen 22 only through 90° about the display screen's optical axis. If 90° rotation of the display screen occurs with both inputs operating, each eye sees both images, and viewing of the stereoscopic image is thereby distorted. If a single input is provided, the single exit pupil is then spread in the horizontal direction to allow viewing of the monoscopic display. Since the pupil is now spread in the horizontal rather than the vertical direction, the allowable vertical head movement within the viewability area is small, being limited to 6.3 cm or 2.5 inches, and the horizontal head movement is large corresponding to the prior vertical movement, that is, 30.5 cm or 12 inches. This technique of stereoscopic to monoscopic display conversion maintains constant display brightness with high illumination efficiency regardless of the mode of operation. If greater vertical head motion is desired for viewing in the monoscopic display mode, either display brightness or horizontal head motion must decrease. The monoscopic display conversion would likely be used primarily for redundancy in case of unexpected component failure.

Similar results may be obtained by using larger imaging lenses masked to provide the desired pupil shape. However, possible disadvantages of this technique are the necessity for expensive specially ground lenses or a beam splitter which would reduce illumination efficiency by another 50 to 60%.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a stereoscopic viewing system including stereoscopic inputs and an optical display system and wherein said optical display system includes a pair of optical trains, one for each input, and defining therebetween respective intersecting optical axes, a field lens forming a display screen and each optical train further including lens means cooperating with said field lens for focusing a respective stereo image at the intersection of said axes and for forming an exit pupil corresponding to said input respectively at a predetermined focal distance from said field lens such that a viewer situated at that distance from the field lens has his eyes coincident respectively with said exit pupils, the improvement wherein:

said stereoscopic inputs comprise separate television cameras, said system includes means for mounting said cameras for movement laterally relative to each other on a base line facing the television camera field of view and for rotating each camera about an axis at right angles to the plane of the convergence point and the base line, for varying the angle of convergence between said intersecting optical axes of said television cameras and for varying the field of view of the television cameras to improve the viewing comfort of the optical display system, said system includes a pair of cathode ray tubes acting as stereo image projectors operatively coupled to said television cameras defining said stereoscopic input and being operatively positioned with respect to said pair of optical trains, said field lens comprising a Fresnel lens facing the viewer and a composite lenticular lens facing said stereo projectors.

2. The stereoscopic viewing system as claimed in claim 1, wherein said means for varying the field of view of the stereo sensors and for varying the convergence angle of the optical axes of the individual stereo sensors operate in accordance with the relationship $$\beta = \left(\frac{2 \tan FOV}{2}\right) \times \left(\frac{d}{D}\right)$$

where $\beta$ is the convergence angle, $FOV$ is the camera field of view, $d$ is the maximum desired lateral image displacement between right and left images normally limited by viewer's interpupillary dimension, and $D$ is the display screen horizontal dimension.

3. The stereoscopic viewing system of claim 1, further comprising lens means operatively associated with said optical train for enlarging one of said exit pupils in the absence of the stereo input to said other exit pupil.

* * * * *